United States Patent [19]
Reed

[11] 3,799,063
[45] Mar. 26, 1974

[54] VEHICLE BATTERY CHANGING DEVICE
[76] Inventor: David M. Reed, P.O. Box 652, Martin, Ky. 41649
[22] Filed: Aug. 16, 1972
[21] Appl. No.: 281,090

[52] U.S. Cl.............. 104/134, 105/51, 180/65 R, 214/77 R
[51] Int. Cl............................................. A63g 21/00
[58] Field of Search ............... 104/34; 105/50, 51; 180/65 R; 214/77 R

[56] References Cited
UNITED STATES PATENTS
2,290,738  7/1942  Chadwick .................. 214/77 R
3,708,028  1/1973  Hafer ......................... 104/34
FOREIGN PATENTS OR APPLICATIONS
603,473  4/1926  France ....................... 105/51

Primary Examiner—Robert G. Sheridan
Assistant Examiner—D. W. Keen

[57] ABSTRACT

A vehicle battery changing and positioning device particularly suitable for use with electric driven vehicles of a mine operating type and the like, including lift arms pivotally mounted to the vehicle frame and releasably attached at their free ends to a battery tray and cover, with hydraulic actuating means to pivotally displace the arms and thereby move the battery tray and cover through an arc from an inner to an outer position to facilitate changing or servicing. Releasable hold down and locking means are provided.

5 Claims, 7 Drawing Figures

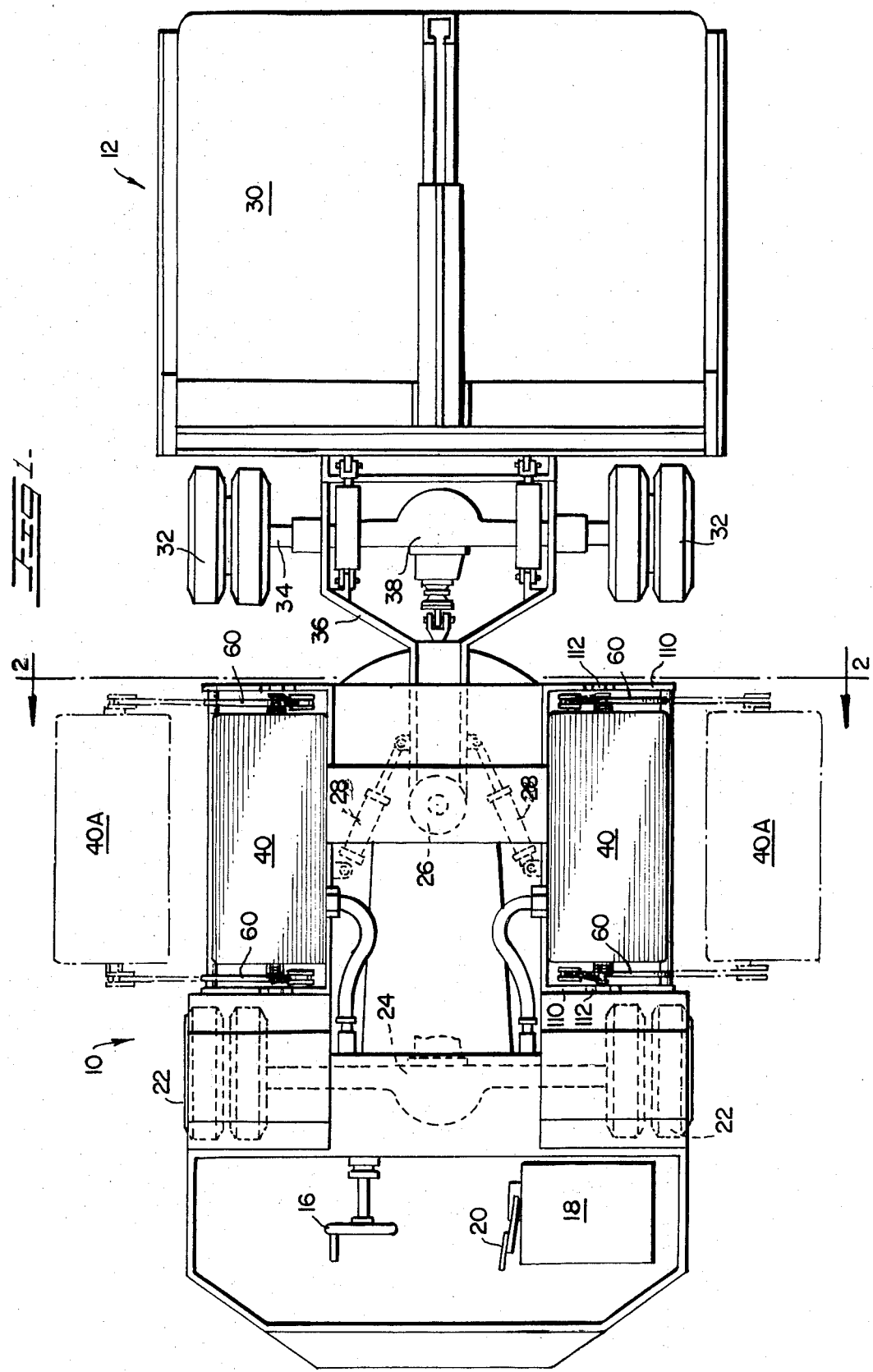

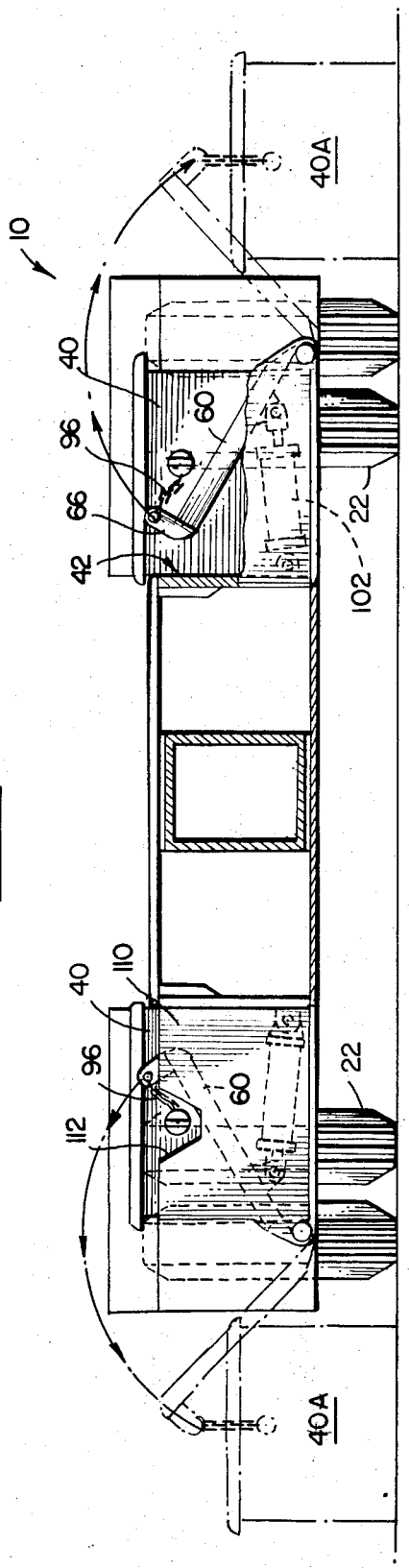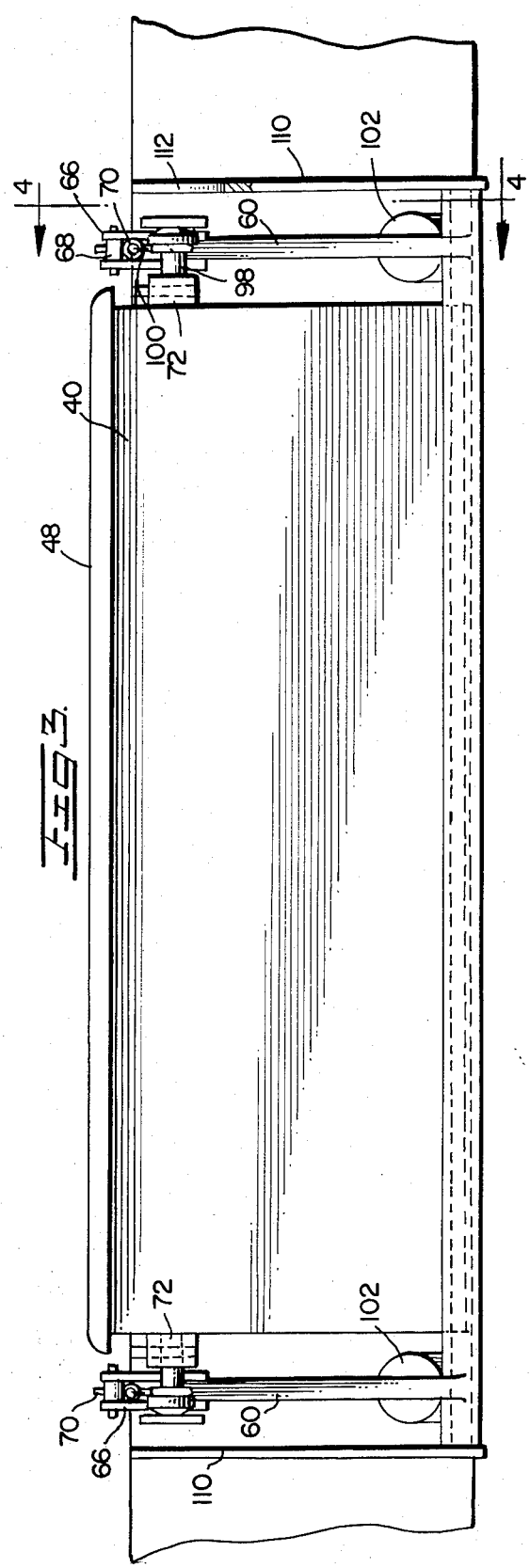

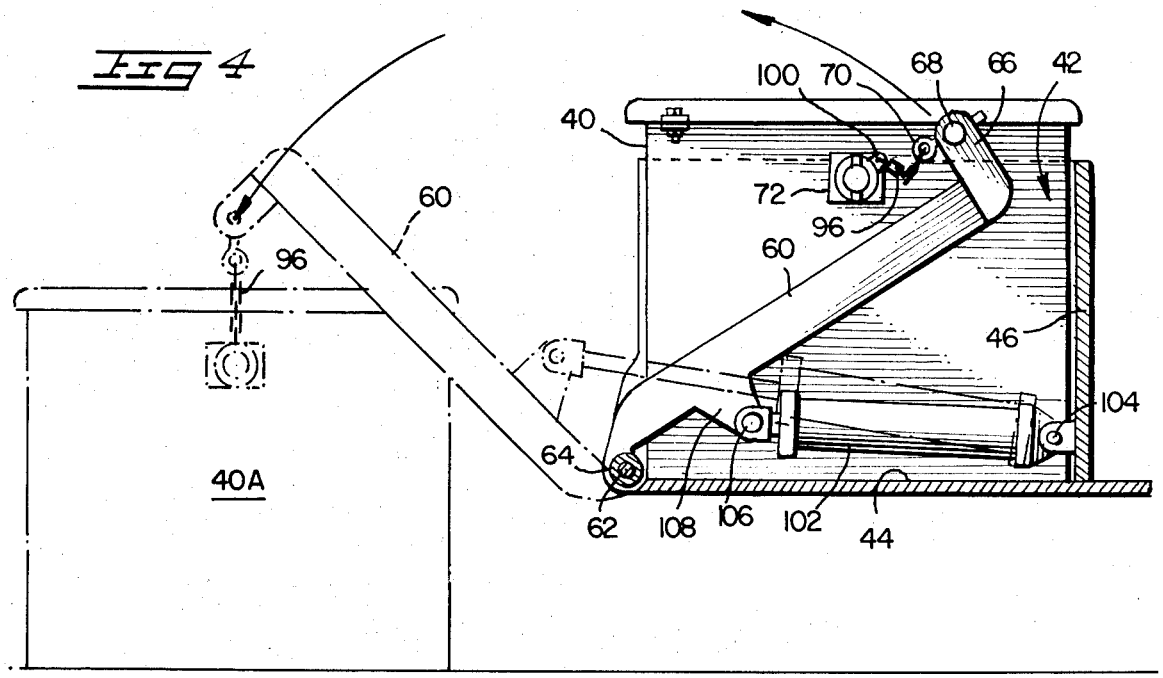
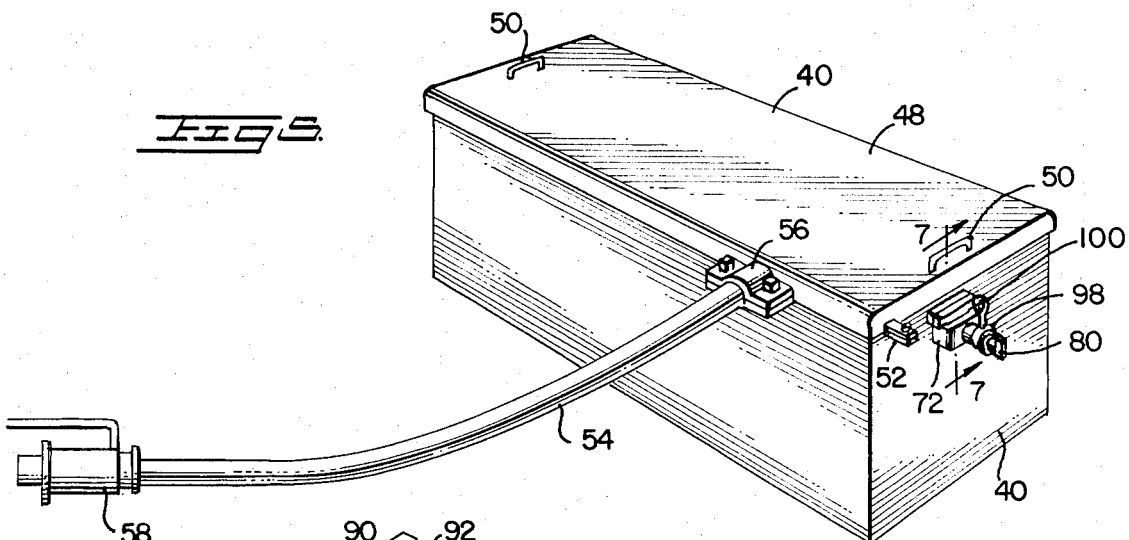
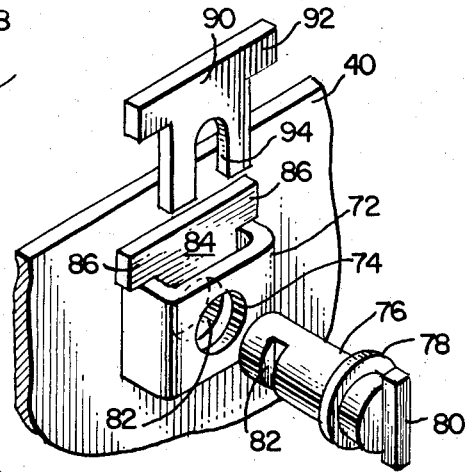
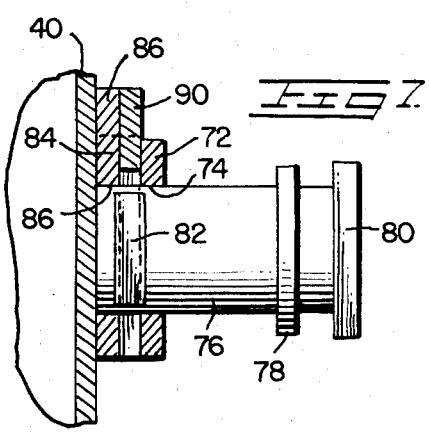

VEHICLE BATTERY CHANGING DEVICE

BACKGROUND OF THE INVENTION

In electrically driven vehicles of a mine operating type and the like, such as shown, for example, in prior U.S. Pat. Nos. 3,226,857 and 3,545,634, the batteries are of substantial size and weight and require relatively frequent servicing and/or changing. Such batteries may, for example, consist of 64 cell units and have dimensions of 72 inches by 19 inches. Such batteries are normally mounted in battery trays with covers and are adapted for positionment in a battery compartment on the vehicle. Due to weight, size and frequency of servicing and/or changing requirements, mechanism must be provided to facilitate movement or displacement of the battery with the tray into and out of association with the vehicle and to render the battery readily available for servicing and changing. Hold down and locking means are also desirable to prevent accidents and inadvertent displacement.

The present invention is directed to the changing and positioning mechanism and, additionally, releasable hold down and locking means.

SUMMARY OF THE INVENTION

The present invention provides changing and positioning mechanisms for vehicle batteries of a type used in electrically driven vehicles of a mine operating type and the like. Lift arms are pivotally mounted to the vehicle frame and are releasably attached at their free ends to a battery tray and cover through appropriate takeup and swing means. Hydraulic cylinders are interconnected between the vehicle and a median position on the lift arms and are actuatable to pivotally displace the arms to thereby move the battery tray and cover through an arc from an inner to outer position to facilitate servicing or changing. The apparatus also includes restraining, clamping means, and hold down and locking pins and associated mechanism.

Additional objects and advantages of the invention will become more readily apparent from the following detailed description of an embodiment thereof when taken together with the accompanying drawings in which:

FIG. 1 is a top plan view of a work vehicle of a type employed in mining operations embodying the present invention;

FIG. 2 is an elevational view taken on line 2—2 of FIG. 1, and showing a battery tray and change mechanism in retracted and displaced positions;

FIG. 3 is an enlarged fragmentary side elevational view of the battery case and associated displacing mechanism;

FIG. 4 is an end elevational view of the structure taken on line 4—4 of FIG. 3, with the retracted position shown in full lines and displaced position in broken lines;

FIG. 5 is a perspective view disclosing the battery case and including electrical interconnecting means from the battery to the vehicle and lift and swing out pin means and associated locking mechanism;

FIG. 6 is an enlarged fragmentary perspective view of the swing pin and associated hold down and locking clips, partially exploded for clarity; and FIG. 7 is a sectional view taken on line 7—7 of FIG. 5.

Referring now more specifically to the drawings, there is shown in FIG. 1 a work vehicle of a type especially adapted for use in mining operations and the like. This includes a rear section 10 and a forward or front section 12 which are independent and operatively associated. The overall vehicle is adaptable to numerous environments of utilization but is of particular advantage in low overhead subterranean locations, such as mine shafts. A low structural profile is required for use in this particular area of industry and the apparatus moreover must be, insofar as possible, rugged and not susceptible of damage in normal usage. The rear section, as shown in greater detail in the above mentioned patents, usually incorporates the drive and operating mechanism for the vehicle. This includes such as the riding pallet 14, steering wheel 16, control component housing 18 and operating lever 20. Drive and support wheels 22 are operably connected to gearing generally designated 24 of a usual type. The front and rear sections are pivotally interconnected as generally indicated at 26 and operable through hydraulic cylinder mechanisms 28.

The front section 12 includes an open bucket 30 which is supported by wheels 32 at its rear mounted on axle structures 34 and connected through frame 36 to pivotal interconnection 26. A drive transmission 38 is utilized for motive and control.

Such apparatus as more fully shown and described in U.S. Pat. No. 3,545,634 is adapted for driving and operation by electric batteries. These electric batteries must be capable of substantial power output and relatively long use periods between servicing and/or changing. The present device, for example, utilizes two electric storage batteries which can be, for example, 64 cell units and have dimensions such as 72 inches by 19 inches, although different size units can be incorporated. These batteries are mounted in battery cases 40, in the present instance two units being used, and FIG. 1 shows the battery cases 40 in mounted position on the vehicle in full lines and in displaced position at 40a for servicing or changing. The battery cases, when vehicle mounted, are supported in compartments 42, generally indicated, formed between support floor 44 and upright wall 46, constituting components of the vehicle. A battery case cover 48 is removably mounted on the battery case and includes handles 50 to facilitate removal and securing means generally indicated at 52 which can be of any desired structure, but as shown include mating lugs and bolts.

The battery per se, not shown, is operatively interconnected to the vehicle drive and control mechanisms through electrical leads within hose 54 mounted into the battery casing or tray 40 by restraining clamps 56 and restraining glands 58 for interconnection with the vehicle drive and control mechanisms, the restraining glands being portions of interconnecting socket means.

Ejector or lift arms 60 are respectively mounted to the vehicle at opposite ends of battery case 48 by securement to a longitudinal ejector shaft 62 mounted on ejector pivot pin 64. Clevis plates 66 are secured to the free ends of arms 60 and through which are mounted swing shafts 68 in a pivotal manner. Takeup swing pins 70 in the nature of threaded I-bolts are threadedly engaged within swing shafts 68 and are adjustable therein. The clevis plates act in the nature of a supporting yoke for the swing shafts. The takeup swing pins are in operation clevis pins. Means are interconnected to the battery case at opposed ends thereof for operating interengagement with the arms 60 to move the battery cases and batteries between the mounted position 40 and displaced position 40a. In the embodiment shown, this includes brackets 72 secured to the ends of the battery case and having apertures 74 therethrough. A lift and locking pin 76 is insertable through apertures 74 and outboard are provided with flanges or collars 78 and handles 80. The pins are also provided with opposed grooves 82 proximate the inner ends thereof. Apertured clips 84 are insertable within the open brackets 72 and are provided with ears 86 on the top thereof which are in bearing engagement with the upper surface of the leg portions of the brackets. The aperture 88 of clip 84 when so mounted is aligned with aperture 74 of the bracket. The pins are inserted through apertures 74 and engage in apertures 88 in a locking arrangement and, when the battery case is lifted for movement the forces are transmitted from the pin to the spaced apertures with the ears 86 distributing the bearing forces. A slotted locking clip 90 of similar configuration to apertured clips 84 are also provided with ears 92 and the slot 94, in the inserted position of the clip, operatively engages with grooves 82 of pins 76. The pins, upon insertion in the brackets and the aligned apertures, is rotated by means of handles 80 to position grooves 82 to permit insertion of clips 90 and the pins are thereby restrained from withdrawal until the clips 90 are removed. The ears 92 again function similar to the ears 86 of clips 84.

Takeup swing chains 96 are attached at one end to eye of takeup swing pins 70 and the opposite ends thereof are attached to collars 98 through hooks or eyes 100 attached thereto. The collars are mounted on pins 76 as shown in FIG. 4.

Hydraulic cylinders 102 are pivotally mounted at 104 to upright wall 46 as shown in FIG. 4 and the pistons thereof are pivotally connected at 106 to ears or lugs 108 on arms 60 intermediate the ends thereof, but in closer proximity to the attachment to ejector shaft 62. Actuation of hydraulic cylinders 102 serves to pivot arms 60 to thereby move the battery cases from the inboard or vehicle mounted position 40 to the detached or outboard position at 40a to facilitate battery changing with appropriate manipulation of the locking mechanism. Intermediate positions can also be assumed for servicing access or the like. End plates 110 which cooperate with floor 44 and wall 46 to form a battery compartment are provided with cut outs 112 to permit access to pins 76 and associated mechanism.

Manifestly, minor changes in details of construction can be effected without departing from the spirit and scope of the invention as defined in and limited solely by the appended claims.

I claim:

1. A vehicle battery changing and positioning device adapted for mounting an electric storage battery and casing in an electrically driven vehicle and the like, and removing the same, comprising:
   A. laterally spaced pivotally mounted lift arms;
   B. interconnection means separably connecting the free ends of said arms to and suspending said casing therefrom, including:
      i. clevis pins threadedly adjustably interconnected with the free ends of said arms;
      ii. swing chains freely connected to said clevis pins;
      iii. pins attached to the ends of said casing; and
      iv. said chains pivotally interconnecting said clevis pins and said pins on said casing; and
   C. actuating means for selectively pivoting said arms from an inboard to an outboard position to respectively position said casing and battery in said vehicle and remove the same therefrom, with the casing being moved through an arc while freely suspended from said arms and with the battery in an upright position, said arm actuating means including:
      i. hydraulic cylinder, piston and rod units, pivotally mounted at one end to the vehicle and the free ends of said piston rods being pivotally connected to said arms intermediate to the ends thereof.

2. A vehicle battery changing and positioning device adapted for mounting an electric storage battery and casing in an electrically driven vehicle and the like, and removing the same, comprising:
   A. laterally spaced pivotally mounted lift arms;
   B. interconnection means separably connecting the free ends of said arms to and suspending said casing therefrom;
   C. releasable and removable hold down and locking means separably connecting said arms and said casing, including:
      i. generally U-shaped brackets attached to the ends of said casing, said brackets having apertures in the base thereof, pins insertable through said apertures in said brackets and supported therein, and means adjustably interconnecting the ends of said arms and said pins; and
   D. actuating means for selectively pivoting said arms from an inboard to an outboard position to respectively position said casing and battery in said vehicle and remove the same therefrom, with the casing being moved through an arc while freely suspended from said arms and with the battery in an upright position.

3. A device as claimed in claim 2, including an apertured clip having laterally extending ears thereon, said clip being insertable in said bracket with the ears in bearing relationship in the legs of said brackets and the clip aperture being in alignment with said aperture in the base of said bracket and constituting hold down and load bearing transfer means between said pin and said casing.

4. A device as claimed in claim 3, said pin having opposed grooves in the surface thereof, a slotted locking clip having laterally extending ears thereon, said locking clip being insertable in said bracket with the slot therein engaging in the grooves of said pin and preventing removal of said pin when so interengaged, said ears being in load bearing relationship on the legs of said brackets.

5. A device as claimed in claim 4, said pin having a collar thereon proximate the outer end thereof, a collar rotatably mounted on said pin inboard of said collar and a swing chain interconnecting said rotatable collar and the ends of said arms and constituting interconnection means therebetween.

* * * * *